(12) United States Patent
Kumar et al.

(10) Patent No.: US 12,632,512 B2
(45) Date of Patent: May 19, 2026

(54) ULTRASONIC SYSTEM AND METHOD FOR TUNING A MACHINE LEARNING CLASSIFIER USED WITHIN A MACHINE LEARNING ALGORITHM

(71) Applicant: Robert Bosch GmbH, Stuttgart (DE)

(72) Inventors: Abinaya Kumar, Heimsheim (DE); Fabio Cecchi, Menlo Park, CA (US); Ravi Kumar Satzoda, Milpitas, CA (US); Lisa Marion Garcia, Santa Clara, CA (US); Mark Wilson, Pullman, WA (US); Naveen Ramakrishnan, Campbell, CA (US); Timo Pfrommer, Stuttgart (DE); Jayanta Kumar Dutta, Sunnyvale, CA (US); Juergen Johannes Schmidt, Magstadt (DE); Tobias Wingert, Leonberg (DE); Michael Tchorzewski, Böblingen (DE); Michael Schumann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1335 days.

(21) Appl. No.: 17/303,992

(22) Filed: Jun. 11, 2021

(65) Prior Publication Data

US 2022/0398414 A1 Dec. 15, 2022

(51) Int. Cl.
*G06F 18/21* (2023.01)
*G01S 15/08* (2006.01)
(Continued)

(52) U.S. Cl.
CPC ............ *G06F 18/217* (2023.01); *G01S 15/08* (2013.01); *G01S 15/931* (2013.01); *G06F 18/241* (2023.01); *G06N 20/00* (2019.01)

(58) Field of Classification Search
CPC ..... G06F 18/217; G06F 18/241; G06N 20/00; G01S 15/08; G01S 15/931
See application file for complete search history.

(56) References Cited

U.S. PATENT DOCUMENTS

| | | | |
|---|---|---|---|
| 10,891,374 B1 | 1/2021 | Curtin et al. | |
| 2014/0029840 A1 | 1/2014 | Jebara et al. | |
| 2021/0046924 A1* | 2/2021 | Caldwell | ............... B60W 30/09 |

OTHER PUBLICATIONS

R. Theagarajan, F. Pala and B. Bhanu, "EDeN: Ensemble of Deep Networks for Vehicle Classification," 2017 IEEE Conference on Computer Vision and Pattern Recognition Workshops (CVPRW), Honolulu, HI, USA, 2017, pp. 906-913, doi: 10.1109/CVPRW.2017. 125. (Year: 2017).*

(Continued)

*Primary Examiner* — Michael H Hoang
(74) *Attorney, Agent, or Firm* — Brooks Kushman P.C.

(57) ABSTRACT

A method and system is disclosed for tuning a machine learning classifier. An object class requirement may be provided and include rank thresholds. The object class requirements may also include a range goal that defines a minimum distance from the object the machine learning algorithm should not provide false positive results. A base classifier may be trained using a weighted loss function that includes one or more weight values that are computed using the one or more object class requirements. An output of the weighted loss function may be evaluated using an objective function which may be established using the one or more object class requirements. The one or more weights may also be re-tuned using the weighted loss function if the output of the weighted loss function does not converge within a predetermined loss threshold.

20 Claims, 7 Drawing Sheets

(51) Int. Cl.
　　*G01S 15/931*　　　(2020.01)
　　*G06F 18/241*　　　(2023.01)
　　*G06N 20/00*　　　(2019.01)

(56)　　　　　　References Cited

OTHER PUBLICATIONS

P. Saisan and S. Kadambe, "Shape normalized subspace analysis for underwater mine detection, " 2008 15th IEEE International Conference on Image Processing, San Diego, CA, USA, 2008, pp. 1892-1895, doi: 10.1109/ICIP.2008.4712149. (Year: 2008).*

Ibrahim, H.A., Azar, A.T., Ibrahim, Z.F., Ammar, H.H. (2020). "A Hybrid Deep Learning Based Autonomous Vehicle Navigation and Obstacles Avoidance." Proceedings of the International Conference on Artificial Intelligence and Computer Vision (AICV2020). AICV 2020. (Year: 2020).*

* cited by examiner

500

1. Input: Object class importance and range goals for each object $(c_i, r_i)$ where $0 \le i < N$ for $N$ object classes 2. Input: XGBoost classifier parameters - $H$ 3. Initialize learned weights $B = b_i, 0 \le i < N$ for $N$ object classes a. Set range of learned weights for tuning using $c_i$ in the following way: $[\frac{c_i}{3}] \le b_i \le c_i^2$ 4. Train XGBoost classifier C with B and H a. Compute weights:

i. $w_d = f(d, r_i)$ : weight based on distance and range goal ii. $w_c = f(c_i)$ : weight based on object importance iii. $w_n = f(N_h, N_i)$ : weight based on data imbalance b. Optimize for logistic loss function for high versus low classes using weights in 3.a.

5. Tune for hyperparameters - $B$ a. Evaluate classifier C using DTO squared loss = $f(c_i, r_g)$ b. Select next hyperparameters using *HyperOpt* strategy

FIG. 5

ULTRASONIC SYSTEM AND METHOD FOR TUNING A MACHINE LEARNING CLASSIFIER USED WITHIN A MACHINE LEARNING ALGORITHM

TECHNICAL FIELD

The following relates generally to tuning a machine learning classifier used within a machine learning algorithm for classifying objects based on data received from one or more ultra-sonic sensors.

BACKGROUND

Vehicles may include systems and sensors to detect stationary or mobile obstacles. However, vehicle systems may not be able to distinguish between the various stationary vehicles. For instance, ultrasonic sensors may be used within a vehicle system to detect obstacles near a vehicle during parking, blind spot detection, or maneuvering. Current vehicle systems employing ultrasonic sensors may employ rule-based empirical classifiers that are partly based on geometric relations of the detected obstacle echoes. Rule-based classifiers, however, may (1) generate weak true positives and false positive performance; (2) be difficult to adapt to specific vehicle variants; or (3) have a high dependence on the number and type of object classes.

SUMMARY

A system and method is disclosed for tuning a machine learning classifier. The system and method may receive one or more object class requirements that include one or more rank thresholds used to rank an object. The one or more object class requirements may include a range goal that defines a minimum distance from the object a machine learning algorithm should not provide false positive results. A base classifier may be trained using a weighted loss function that includes one or more weight values that are computed using the one or more object class requirements. An output of the weighted loss function may be evaluated using an objective function (e.g., squared distance to object error) that may be established using the one or more object class requirements. The one or more weight values may then be re-tuned using the weighted loss function if the output of the weighted loss function does not converge within a predetermined loss threshold.

It is contemplated the weighted loss function may be a cross entropy classification loss function. The object class requirements may also be established for an ultra-sonic sensor system used within differing vehicle platforms. The object class requirements may be used to define objects having a specific geometry or objects of rigid structure (e.g., brick walls). The base classifier may be used to determine a weak true positive output or false positive results used for classifying the object. Lastly, the base classifier may be used to define a predetermined distance between a vehicle and the object before a vehicle safety system is activated.

BRIEF DESCRIPTION OF THE DRAWINGS

FIG. 5 is an exemplary machine learning algorithm operable to tune classifiers used by the machine learning algorithm.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present embodiments.

Figure 1:
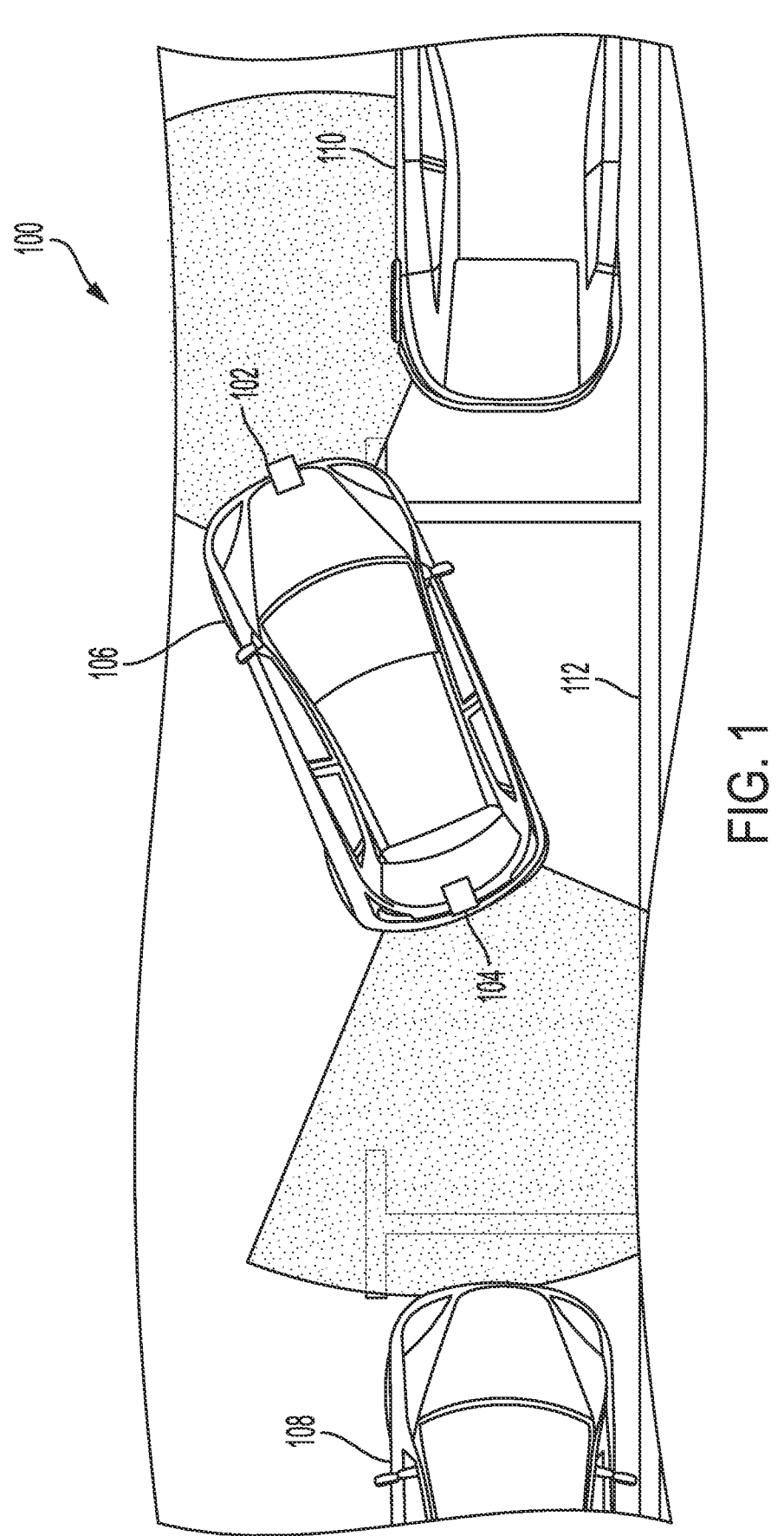
FIG. 1 illustrates a vehicle with an ultrasonic sensor system parallel parking.

Currently, ultrasonic sensor systems employed within mobile applications may be operable to detect the distances of obstacles near a vehicle during parking, blind spot detection, or maneuvering. For instance, FIG. 1 illustrates an ultrasonic system 100 where a plurality of ultrasonic sensors 102, 104 may be employed to provide parking assistance to a driver of a vehicle 106. The ultrasonic system 100 may provide audio or visual alerts to a driver while attempting to park the vehicle 106 within a parking space. The alerts may warn the driver about the distance between vehicle 106 and a given obstacle (e.g., vehicle 108, vehicle 110 or curb 112). The ultrasonic system 100 may also be operable to apply a braking system if vehicle 106 within a predetermined distance of a given obstacle. As such, ultrasonic system 100 may provide convenient and safe parking of a vehicle thereby avoiding costly repairs and damage.

Alternatively, ultrasonic system 100 may be employed to provide parking assist to a driver. For instance, ultrasonic system 100 may provide parking assistance where the vehicle 106 parks the vehicle automatically without the need for the driver to provide steering guidance. Instead, the driver may only be required to provide acceleration and braking assistance during the parking procedure.

Figures 2A, 2B:
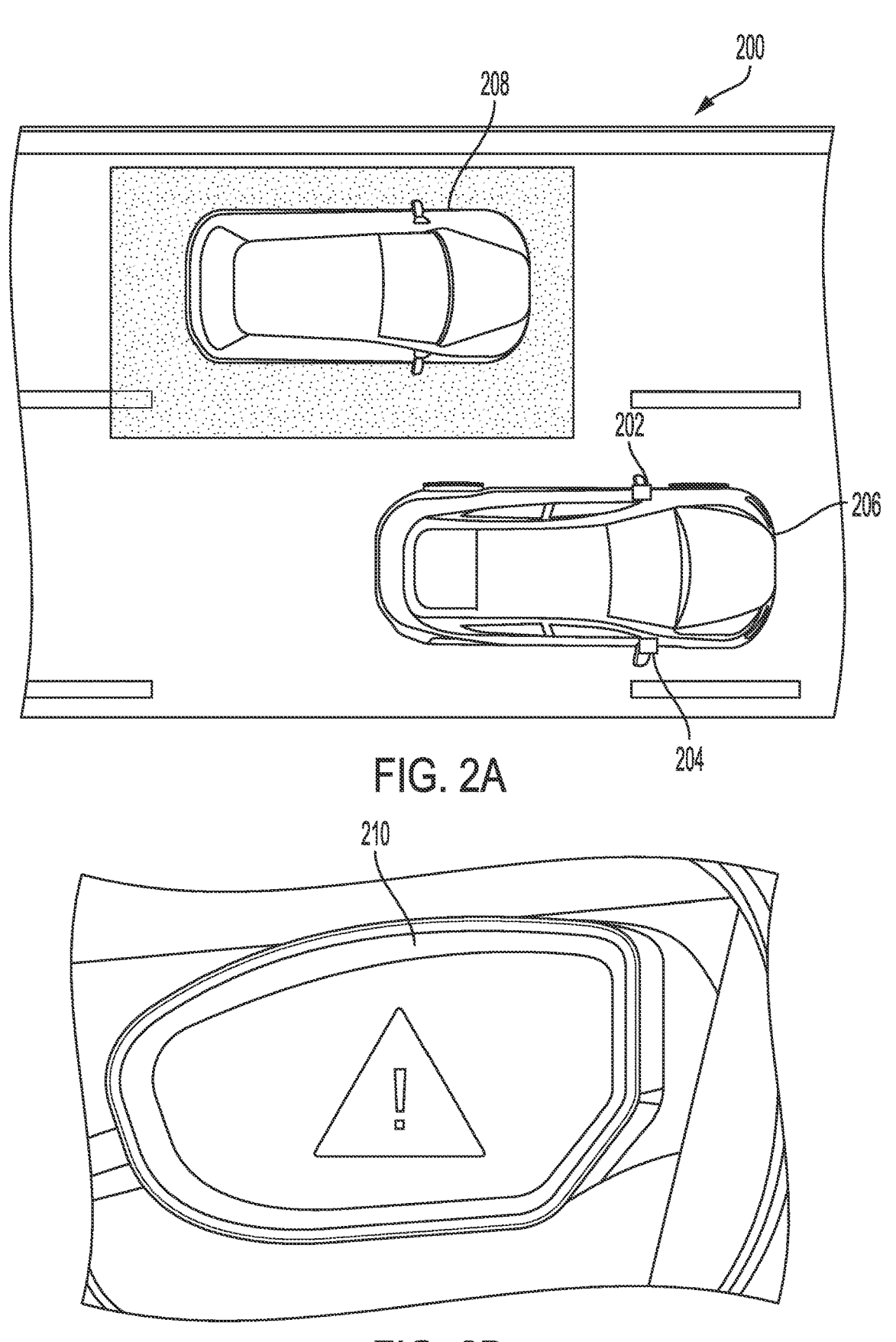
FIG. 2A illustrates a vehicle with an ultrasonic sensor system while driving.
FIG. 2B illustrates a visual warning system within a vehicle side mirror.

FIGS. 2A and 2B illustrate an exemplary ultrasonic system 200 that may be employed for blind spot detection. As illustrated, ultrasonic system 200 may include ultrasonic sensors 202, 204 placed on each side of a vehicle 206 near or within the right and left side rear-view mirrors. The ultrasonic sensors 202, 204 may be operable to monitor the space in an adjacent driving lane surrounding vehicle 206. The ultrasonic system 200 may receive data from ultrasonic sensors 202, 204 for detecting obstacles within a driver's blind spot. For instance, if a second vehicle 208 is located within a predetermined distance or area from vehicle 206, the ultrasonic system 200 may activate an audible or visual alert. FIG. 2B illustrates a visual warning sign 210 that may illuminate in the rear-view mirror if ultrasonic system 200 detects an obstacle, e.g., vehicle 208, within a predetermined distance of vehicle 206. If the driver fails to notice the warning and activates the turn signal to change lanes toward vehicle 208, the ultrasonic system 200 may also be operable to activate additional audible or visual warning. Or the ultrasonic system 200 may inhibit or dissuade changing lanes toward the detected obstacle (i.e., vehicle 208). The system 200 may also be operable to detect and/or recognize stationary objects on or alongside the road (e.g., guardrails or parked vehicles) and activate warnings or dissuade vehicle 206 from approaching the stationary objects.

For parking applications, blind spot detection, or maneuvering traditional ultrasonic sensor systems generally employ a rule-based empirical classifiers that are partly based on geometric relations of the detected obstacle echoes. Rule-based classifiers, however, may (1) generate weak true positives and false positive performance; (2) be difficult to adapt to specific vehicle variants; or (3) have a high dependence on the number and type of object classes.

As such, it may be desirable to provide an ultrasonic sensor system and method that is operable to classify the traversibility of obstacles using machine learning methods on ultrasonic object data. With regards to classification, however, false classification of the ultrasonic system could lead to false warnings or false braking of a vehicle. For instance, if system 100 were to falsely classify the given distance of the curb 112 or classify a rock within the road as the curb 112, vehicle 106 may apply the brake before parking was complete. Such a false classification may prohibit the vehicle 106 from parking within the parking space, or the vehicle 106 may not be parked correctly within the parking space.

It is also contemplated that false classification may be rated differently by an ultrasonic system (e.g., system 100) from a user point-of-view based on the distance from where the classification may occur. False classification in a "far" field may be tolerated because the determination or impact on the vehicle may be small. But, false warnings in a "close" field may lead to undesirable outcomes such as a potential vehicle crash or false braking during maneuvering. For instance, if vehicle 208 illustrated in FIG. 2A was located 2-3 lanes away from vehicle 206 (i.e., potentially 50 feet or more away from vehicle 206), a false classification (e.g., failure to detect vehicle 208) may not have an undesirable outcome if vehicle 206 is attempting to change lanes. But, if vehicle 208 was in the next lane (i.e., possibly within 10 feet from vehicle 206), a false classification may have an undesirable outcome as vehicle 206 may crash into vehicle 208.

It is therefore contemplated that the acceptable distance for correct classification may be object dependent (i.e., obstacle dependent). Correct classification may be required because the contour, shape, or type of a given object may differ. For instance, correct classification of a bush or wood fence may not be as necessary as correct classification of a vehicle (e.g., vehicle 208) or cement/brick wall. So if system 200 incorrectly classified a bush, vehicle 206 may not be damaged as severe as incorrect classification of vehicle 208. It is also contemplated correct classification of objects with specific geometries (e.g., small reflection cross-section) may have physical detection limitations and can only be detected in a limited proximity field.

It is contemplated a given user (e.g., an automotive original equipment manufacturer or "OEM") may assess the importance of obstacles and acceptable ranges differently. For instance, one user may determine the appropriate detection of vehicle 208 from vehicle 206. Machine learning training routines may not, however, incorporate those dependencies inherently and consequently the performance of the machine learning classifier may not be in accordance with a given user requirement. It is therefore also desirable to provide an ultrasonic sensor system and method that may be operable to tune the machine learning classifier to adapt to specific input requirements (e.g., user requirements from an OEM).

Once the ultrasonic data is classified using a machine learning algorithm and classified based on user input requirements, it is desirable for the proposed machine learning algorithm to output a classifier consisting of multiple decision trees. It is also desirable that the machine learning algorithm calculate a class probability based on the decision trees. It is contemplated these aspects of the machine learning algorithm may be hard coded constituent parts of the software that are compiled before runtime and deployed to a control unit (e.g., electronic control unit "ECU" or controller) within a vehicle.

It is also desirable that the ultrasonic sensor system may require a validation of the parking software in the parking performance after a software freeze. Any adaptation to vehicles after software freeze (i.e., when vehicle is placed into production and software changes are no longer permitted) may be done by means of parameters steering the performance. But it is contemplated that the validation should not change or degrade the integrity of the software. It is also contemplated that additional efforts in verifying and validating the software may be reduced. The same software may also be used for a given bundle or class of vehicles. This may also provide a reduction in cost for management of different software versions with different part numbers for a user or OEM.

Lastly, the classifier may be adapted to new vehicle variants if training data for those vehicles is also available. If the data is not available before software freezes, it is contemplated training may also be done after software freeze with the implication of changing a hard-coded portion or segment of the software. However, such changes may introduce additional costs to the ultrasonic sensor system. It is therefore desirable to set up the machine learning classifier using parameters that may be modified after a software freeze.

Figures 3, 4:
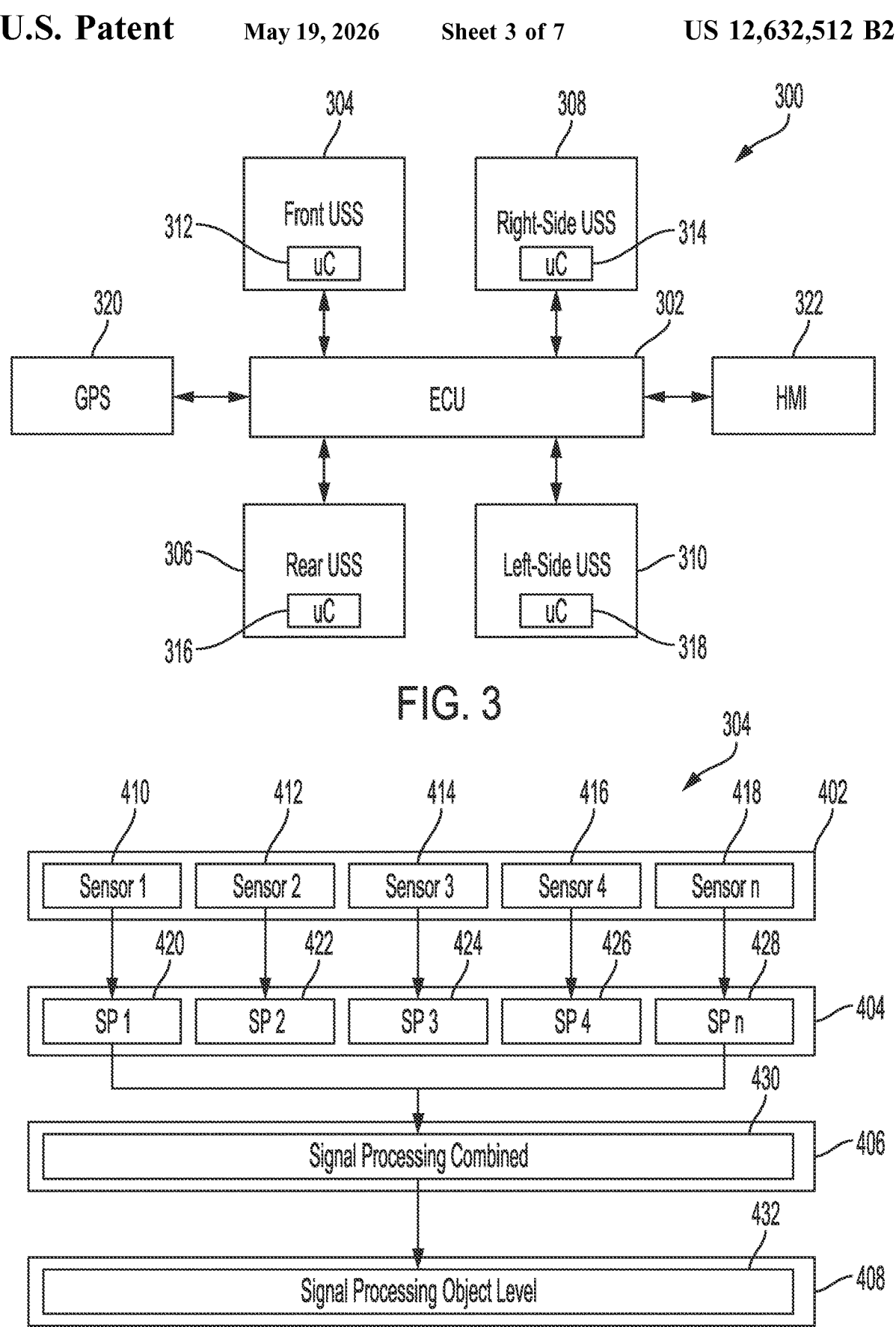
FIG. 3 illustrates an exemplary ultrasonic sensor system operable within a vehicle.
FIG. 4 is an exemplary ultrasonic sensor system for classifying obstacles using a machine learning algorithm.

FIG. 3 illustrates an example block diagram of an ultrasonic sensor system 300 that may be used within a vehicle in accordance with the present disclosure. For instance, system 300 may be incorporated within vehicles 102, 206. System 300 may include a controller 302 such as an electronic control unit (ECU). The controller 302, also referred to herein as ECU, may be embodied in a processor configured to carry out instructions for the methods and systems described herein. The controller 302 may include a memory (not individually shown in FIG. 3), as well as other components, specifically processing within the vehicle. The controller 302 may be designed using one or more computing devices such as a quad core processor for processing commands, such as a computer processor, microprocessor, or any other device, series of devices or other mechanisms capable of performing the operations discussed herein. The controller 302 may include (or be in communication with) memory operable to store instructions and commands. The instructions may be in the form of software, firmware, computer code, or some combination thereof. The memory may be designed using one or more data storage devices, such as volatile memory, non-volatile memory, electronic memory, magnetic memory, optical memory, or any other form of data storage device. In one example, the memory may include 2 GB DDR3, as well as other removable memory components such as a 128 GB micro SD card.

The controller 302 may be in communication with various sensors, modules, and vehicle systems both within and remote from a vehicle. The system 300 may include such sensors, such as various cameras, a light detection and ranging (LIDAR) sensor, a radar sensor, an ultrasonic sensor, or other sensor for detecting information about the surroundings of the vehicle, including, for example, other vehicles, lane lines, guard rails, objects in the roadway, buildings, pedestrians, etc. In the example shown in FIG. 3, the system 300 may include a front ultra-sonic sensor 304 (US S), a rear USS 306, right-side USS 308, and a left-side USS 310. It is contemplated that each USS disclosed may be comprised of one or more individual ultra-sonic sensors. For instance, USS 304 may include a plurality of individual ultra-sonic sensors spread across a front bumper of a vehicle. It is also contemplated USS 304-310 may each include a processor 312-314 (e.g., ECU or controller) and memory separate from ECU 302.

The processors 312-314 may be like ECU 302 described above. The USS 304-310 may further include memory like described above. It is contemplated ECU 302 or processors 312-314 may be operable to execute the machine learning algorithm for classifying and identifying ultrasonic object data. By operating the machine learning algorithm on processors 312-314 it is contemplated that resource consumption may be reduced (e.g., less than 200 DMIPS) and hardware accelerators may not be required. As discussed below, performance of classifying the traversibility of obstacles may be tunable according to the available processors 312-314 without much intervention when compared to rule-based classifiers.

It is contemplated that FIG. 3 is merely exemplary system 300 may include more or less sensors, and sensors of varying types. Further, while FIG. 3 is shown with specific sensors in specific locations that may be positioned around a vehicle, the system 300 may be equipped with additional sensors at different locations within or around the vehicle, including additional sensors of the same or different type.

It is also contemplated sensors 304-310 may each be configured to measure a distance to a target arranged external and proximal to the vehicle. As described further below, sensors 304-310 may be operable to classify a target as a vehicle, curb, roadblock, buildings, pedestrian, etc. It is also contemplated sensors 304-310 may work in conjunction with other vehicle components, such as the ECU and other sensors, to further enhance the classification of various targets outside of the vehicle.

As explained, FIG. 3 discloses a front USS 304 and a rear USS 306. The front USS 304 may be used to classify and determine vehicles or objects in the front peripheral of the vehicle. The rear USS 306 may be used to classify and determine what vehicles or objects are in the rear peripheral of the vehicle. Each USS 304-306 may also be utilized to help or enhance various vehicle safety systems. The front USS 304 may be mounted or built into a front bumper of the vehicle to determine that an object is ahead of the vehicle. The rear USS 306 may be mounted in the corner or center of a rear bumper of the vehicle. However, it is contemplated the front USS 304 and rear USS 306 may be positioned or located at other locations on a vehicle so as to be operable to capture objects ahead and behind the vehicle.

Right-side USS 308 and left-side USS 310 may be used to classify and determine vehicles or objects on the right-side or left-side. Each USS 308-310 may also be utilized to help or enhance various vehicle safety systems. USS 308-310 may be mounted or built into a right-hand or left-hand mirror assembly to determine objects on either side of the vehicle. While it is contemplated USS 308-310 may be mounted in a right-side/left-side mirror of the vehicle, it is also contemplated USS 308-310 may be positioned or located at other locations on a vehicle to operably capture objects on either side of the vehicle.

Again, USS 304-310 may be individually or combined to determine if objects are in a driver's blind spot, as well as detecting vehicles or objects approaching from the rear on the left and right when reversing. Such functionality may allow a driver to navigate around other vehicles when changing lanes or reversing out of a parking space, as well as assist in autonomous emergency braking to avoid collisions that may be imminent.

The system 300 may also include a global positioning system (GPS) 320 that detects or determines a current position of the vehicle. In some circumstances, the GPS 320 may be utilized to determine a speed that the vehicle is traveling. The system 300 may also include a vehicle speed sensor (not shown) that detects or determines a current speed that the vehicle is traveling. The system 300 may also include a compass or three-dimensional (3D) gyroscope that detects or determines a current direction of the vehicle. Map data may be stored in the memory. The GPS 320 may update the map data. The map data may include information that may be utilized with an advanced driver assistance system (ADAS). Such ADAS map data information may include detailed lane information, slope information, road curvature data, lane marking-characteristics, etc. Such ADAS map information may be utilized in addition to traditional map data such as road names, road classification, speed limit information, etc. The controller 302 may utilize data from the GPS 320, as well data/information from the gyroscope, vehicle speed sensor, and map data, to determine a location or current position of the vehicle.

The system 100 may also include a human-machine interface (HMI) display 322. The HMI display 322 may include any type of display within a vehicle cabin. Such HMI display may include a dashboard display, navigation display, multimedia display, heads-up display, thin-film transistor liquid-crystal display (TFT LCD), rear-view mirror indicators, etc. The HMI display 322 may also be connected to speakers to output sound related to commands or the user interface of the vehicle. The HMI display 322 may be utilized to output various commands or information to occupants (e.g. driver or passengers) within the vehicle. For example, in an automatic braking scenario, the HMI display 322 may display a message that the vehicle is prepared to brake and provide feedback to the user regarding the same. The HMI display 322 may utilize any type of monitor or display utilized to visualize relevant information to the occupants.

In addition to providing visual indications, the HMI display 322 may also be configured to receive user input via a touch-screen, user interface buttons, etc. The HMI display 322 may be configured to receive user commands indicative of various vehicle controls such as audio-visual controls, autonomous vehicle system controls, certain vehicle features, cabin temperature control, etc. The controller 302 may receive such user input and in turn command a relevant vehicle system of the component to perform in accordance with the user input.

The controller 302 can receive information and data from additional various vehicle components (e.g., LIDAR sensors, radar sensors, cameras). The controller 302 may utilize the additional data received from these sensors to provide vehicle functions that may relate to driver assistance or autonomous driving. For example, data collected by the LIDAR sensors and cameras may be utilized in context with the GPS data and map data to provide or enhance functionality related to adaptive cruise control, automatic parking, parking assist, automatic emergency braking (AEB), etc. The controller 302 may be in communication with various systems of the vehicle (e.g. the engine, transmission, brakes, steering mechanism, display, sensors, user interface device, etc.). For example, the controller 302 can be configured to send signals to the brakes to slow the vehicle (e.g., vehicle 1000, or the steering mechanism to alter the path of vehicle, or the engine or transmission to accelerate or decelerate the vehicle. The controller 302 can be configured to receive input signals from the various vehicle sensors to send output signals to the display device, for example. The controller 302 may also be in communication with one or more databases, memory, the internet, or networks for accessing additional information (e.g. maps, road information, weather, vehicle information).

Again, it is contemplated that each USS 304-310 may operate individually or in combination to perform classification based on received object data. While USS 304-310 may operate using an individual ultra-sonic sensor, it is preferable USS 304-310 include a plurality of ultra-sonic sensors to perform classification based on received object level data. For instance, USS 304 may include 4-6 ultrasonic sensors spread across the front bumper of the vehicle to perform classification based on received object level data.

For instance, FIG. 4 is an exemplary block diagram of operating levels 402-408 for how USS 304 may perform classification at the object level. While FIG. 4 is an illustration of USS 304, it is understood each USS 306-310 may be designed and operate in a similar manner. As was also described above, while FIG. 4 contemplates processing to occur using processor 312 the processing may also be accomplished using ECU 302. It is further contemplated that the operating levels 402-408 are merely for illustrative purposes, and one or more levels may be combined to perform the classification at the object level.

To carry out classification on the object level, USS 304 may begin at operating level 402 where ultra-sonic sensors 410-418 collect data under different environmental, operating and system conditions by approaching the ego-vehicle towards different object types from various trained machine learning systems. While operating level illustrates four ultra-sonic sensors 410-416, it is contemplated more ultra-sonic sensors (as represented by sensor 418) or less sensors may be used based on a given application and location within or around the vehicle.

At operating level 404, signal processing algorithms 420-428 may be performed on the data collected by each individual sensor 410-418. For instance, signal processing algorithms 420-428 may include echo preprocessing steps (e.g., amplitude filtering) and calculating features on the echo level. More specifically, algorithms 420-428 may calculate features for each individual sensor 410-418 that include mean amplitude, significance, correlation of echoes and number of echoes received.

At operating level 406, one or more signal processing algorithms 430 may be performed on the output of each signal processing algorithm 420-428. The signal processing algorithms 430 may combine the output of each signal processing algorithm 420-428. For instance, signal processing algorithm 430 may include trilateration, object generation of the shape and matching the type of an object. The signal processing algorithm 430 may further calculate features on multiple sensor inputs (e.g., cross-echo reception rate). Lastly, algorithm 430 may be operable to calculate features based on geometric relations from object matching.

For example, the signal processing algorithms 430 may calculate a reception of echoes from one or more of the data provided by sensors 410-418. The reception of echoes determined by signal processing algorithms 430 may include the number of sensors contributing to the obstacle or the cross-echo reception rate. Algorithm 430 may also calculate geometric relations based on trilateration (e.g.,) mean lateral error of the measured trilateration. Or, algorithm 430 may calculate geometric relations from based on point-like or line-like reflection characteristics.

At operating level 408, one or more signal processing algorithms 432 may be performed on the output of the combined signal processing algorithms 430 calculated at operating level 406. Algorithm 432 may be operable to statistically aggregate the calculated features on an object level. Algorithm 432 may also be operable to classify traverse ability based on aggregated features.

However, it is further contemplated that for machine learning (ML) or deep learning (DL) algorithms used within advanced driver-assistance systems (ADAS) that may be operable to assist drivers in driving and parking functions, the algorithms or methods employed may be trained on raw sensor data (e.g., for classification on video streams). The ML/DL classifiers employed for such applications may employ a neural network (e.g., convolutional neural networks (CNNs), recurrent neural networks (RNN), artificial neural networks (ANN)) or similar calculation frameworks. Such frameworks, however, typically require high resource consumption and may not be applicable to the limited computational resources of ultrasonic systems.

It is therefore contemplated that a compute efficient tree based machine learning model may be employed using an extreme gradient boosting ("XGBoost") algorithm. The XGBoost may be an ensemble learning method that comprises a series of boosters. The booster may be a decision tree that provides a classification output. The XGBoost may also include multiple decision trees and an aggregated output from all the trees may be computed to give the final classification result. Lastly, XGBoost may be a standard machine learning algorithm that provides high levels of accuracy for structured data (i.e., features are engineered), but XGBoost may not operate at such a high level of accuracy when applied in native form to height classification for ultrasonic systems.

For improved height classification when employed within an ultrasonic system (e.g., system 300), a data preprocessing model may be employed before training the ML/DL algorithm (i.e., model). The data preprocessing may be designed to remove noisy signals that are captured by the ultrasonic system. In addition to removing noisy signals, the data may be filtered to ensure the ultrasonic system measurements that appear from approaching an obstacle may only be considered in the training dataset.

After the data preprocessing, a training model may be employed for the employed machine learning model (e.g., XGBoost). It is also contemplated that training the XGBoost classifier may involve additional components in addition to the data. For instance, the additional components may include tunable object class weights. Another component may include weights to individual samples of the data. The individual weights may be a function of object importance (which may be assigned by a user), range goal, and the distance at which the input sample may be collected by the ultrasonic system. An objective function may also be designed as a function of user selected object importance and range goals. Additional components may also include automatic feature selections or a computationally efficient sigmoid function for final classification of the output.

Figure 6:
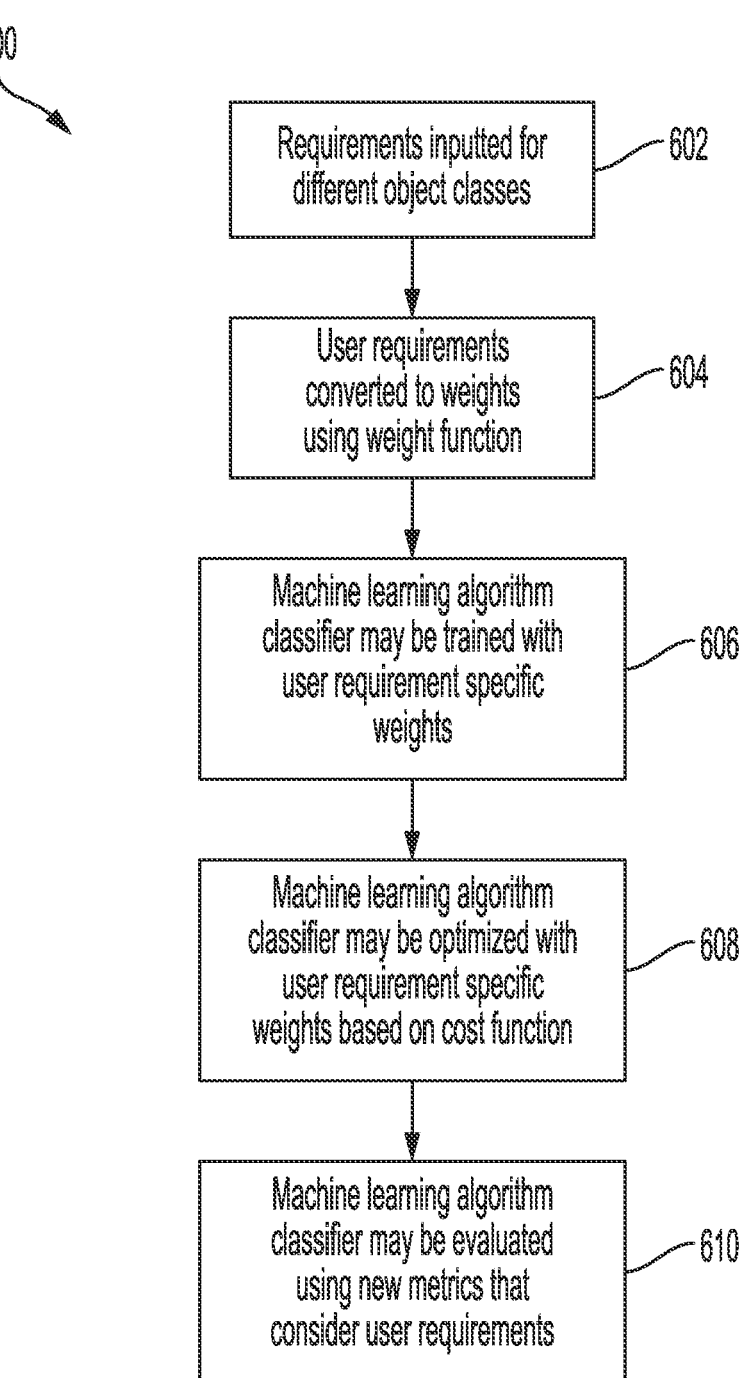
FIG. 6 is an exemplary flow diagram for the machine learning algorithm height classification operable within an ultrasonic sensor system.
Figure 7:
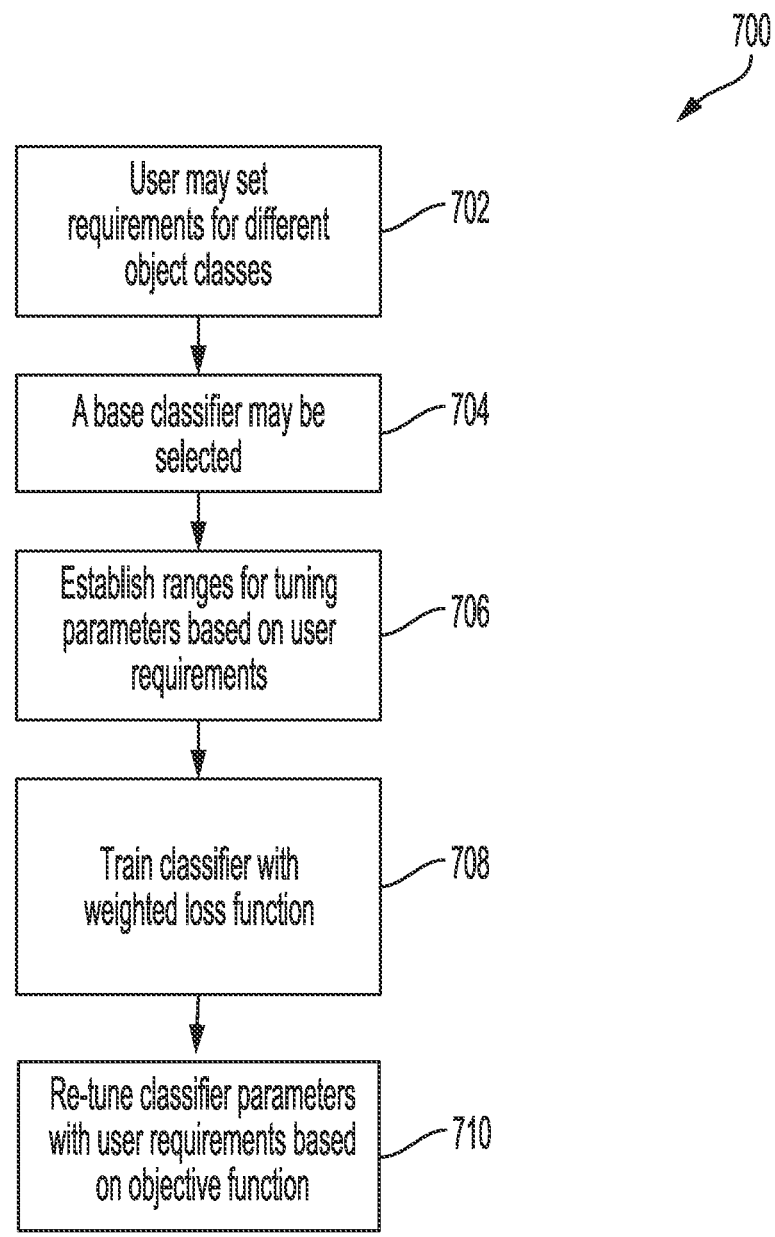
FIG. 7 is an exemplary flow diagram for adapting the machine learning algorithm height classification operable within an ultrasonic sensor system.

FIG. 6 further illustrates an exemplary flow diagram 600 for the ML algorithm for height classification used within an ultrasonic system. Flow diagram 600 may begin at step 602 where a user may establish various requirements for different object classes. At step 604 the user requirements may be used as inputs to the weight function module. It is contemplated, the weight function model may generate (or convert) the user requirements to weights for each input sample.

At step 606, a machine learning classifier may be trained with user requirement specific weights. In other words, the weight inputs (weighted by user requirements) may be used to train the XGBoost classifier with a weighted binary cross entropy loss function. At step 608, the machine learning classifier may be optimized with user requirement specific weights based cost functions. For instance, a loss function may be employed that is flexible and can include additional terms corresponding to regularization (like L2 regularization). At step 610, the machine learning classifier may be evaluated using new metrics that consider user requirements. For instance, the model complexity can be modified based on performance requirements as well as computational constraints such as the depth of the trees, number of boosters, or ensembles of trees. Lastly, it is contemplated that in addition to binary classifiers, a multi-class classifier may be employed for classifying multiple object classes.

It is contemplated that when classification of the ultrasonic system data is complete, the machine learning algorithm may need to be adaptable during the tuning process of one or more of the machine learning classifiers. Being adaptable during the tuning process, the machine learning algorithm may improve the tradeoff on true and false classifications. The tuning process may also be designed to provide an adaption of the classifier based on specific user requirements (e.g., OEM requirements) or may be adaptable to a specific application. For instance, the tuning process may provide adaptability for a specific car variant (e.g., Sports-Utility-Vehicle or Minivan). Or a given OEM (e.g., Ford Motor Company) may require a specific tuning process for their entire fleet of vehicles.

It is also contemplated that the machine learning algorithm may be operable to modify the standard classification loss function (e.g., cross-entropy) to include weighting parameters and range goals for each object class as individual inputs for the tuning routine. The tuning process may therefore provide a set of hyper-parameters that represent tunable weights associated with each object class. The tunable weights may operably be obtained based on the specific customer requirements provided. The customer inputs provided may then be input to the machine learning algorithm at multiple stages of the tuning process. Additionally, a tuning objective function may also operably take into account the customer inputs. The performance of the data classification may therefore be improved, since the best tradeoff may be based and determined using the specific customer requirements. Furthermore, the machine learning algorithm may be easily adaptable to changes in the requirements, thereby reducing the time and cost to implement or based on given applications.

FIG. 5 illustrates an exemplary algorithm 500 for implementing the adaptability during the tuning process of one or more of the machine learning classifiers. It is contemplated one input to algorithm 500 may include object class importance and range goals for each object. The range goals may include a minimum distance from the obstacle below which the ultra-sonic height classification system should not give false positives. The object class importance may include an importance value (e.g., a floating value) that a user may provide to each class of obstacles (e.g. pole, bush, tree, curbstone etc.). It is contemplated the importance value may be operable to indicate how important that obstacle is for the overall evaluation of the system. Lastly, a choice of base classifier may be inputted to algorithm 500.

Again, FIG. 6 illustrates an exemplary flow diagram 600 of a machine learning model for height classification that may be employed in ultra-sonic sensor systems (e.g., system 300). As discussed above, at step 602 user requirements may be inputted (i.e., set) for different object classes. The received user requirements (customer inputs) may include range goals and object class importance values or object classes like those illustrated by algorithm 500. At step 604, the user requirements may then be converted to weight values using a weighting function. At step 606, the machine learning classifier may be trained with user requirement specific weights. At step 608, the machine learning classifier may be optimized with user requirement specific weights based on cost function. At step 610, the machine learning classifier may be evaluated using new metrics that consider the user requirements.

At step 706 ranges may be established for tuning parameters based on user requirements. It is contemplated the base classifier may be trained with a loss function (e.g., weighted loss function) where the weights may be computed based on received inputs (i.e., customer inputs). At step 708, the classifier may be trained with tuning parameters and objective function weighted by user requirements. It is contemplated the performance of the tuned (i.e., trained) classifier is evaluated using a suitable objective function (e.g. squared distance to object (DTO) error in our case) which is specifically designed to cater to a particular user requirement and/or input. If the weights need to be re-tuned, the flow diagram 700 may proceed to step 712 where the classifier may be re-tuned using parameters with user requirements based on the objective function.

At step 706 ranges may be established for tuning parameters based on user requirements. It is contemplated the base classifier may be trained with a loss function (e.g., weighted loss function) where the weights may be computed based on received inputs (i.e., customer inputs). At step 708, the classifier may be trained with tuning parameters and objective function weighted by user requirements. It is contemplated the performance of the tuned (i.e., trained) classifier is evaluated using a suitable objective function (e.g. squared distance to object (DTO) error in our case) which is specifically designed to cater to a particular user requirement and/or input. At step 710, it is determined whether the weights need to be re-tuned. If yes, the flow diagram 700 may return to step 706. If no, the flow diagram may proceed to step 712 where the classifier may be tuned using parameters with user requirements based on the objective function.

Lastly, it is contemplated the trained classifier may be restructured to achieve a fully parametrized machine learning model which may be operable for reconfiguration post deployment within a real-world application. For instance, in automotive applications there may be a point where no more changes may be permitted to occur for software and stored values (i.e., software freeze). The software freeze may include trained classifiers stored (or to be stored) within an ECU of a vehicle. After the software freeze (e.g., after the vehicle has been sold to a customer), it may be desirable to restructure or update the vehicle with new classifier values. It is therefore also desirable to have a fully adaptable classifier that may include a set of parameters operable for training new vehicle variants or object classes after a software freeze. If there exists a defect in a released software, the present method and system may be operable to change the performance on defects by changing the parameters. Such changes may simplify the handling of defects.

It is contemplated the disclosed system and method may use a given machine learning model that includes a fixed structure. The fixed structure may comprise a varying number of trees and/or depth with fully populated leaves where all nodes of the trees (e.g., if/else expression) consist of parameters. In one example, a node that is expressed as "feature_value>threshold_value" may be comprised of 3 parameters that individually include: (1) "feature_value"; (2) ">"; and (3) "parameter_value". It is also contemplated the parameters may be determined and assigned during the configuration process. However, it is contemplated that the system and method may need to account for handling invalid feature values and non-populated leaves.

Figure 8:
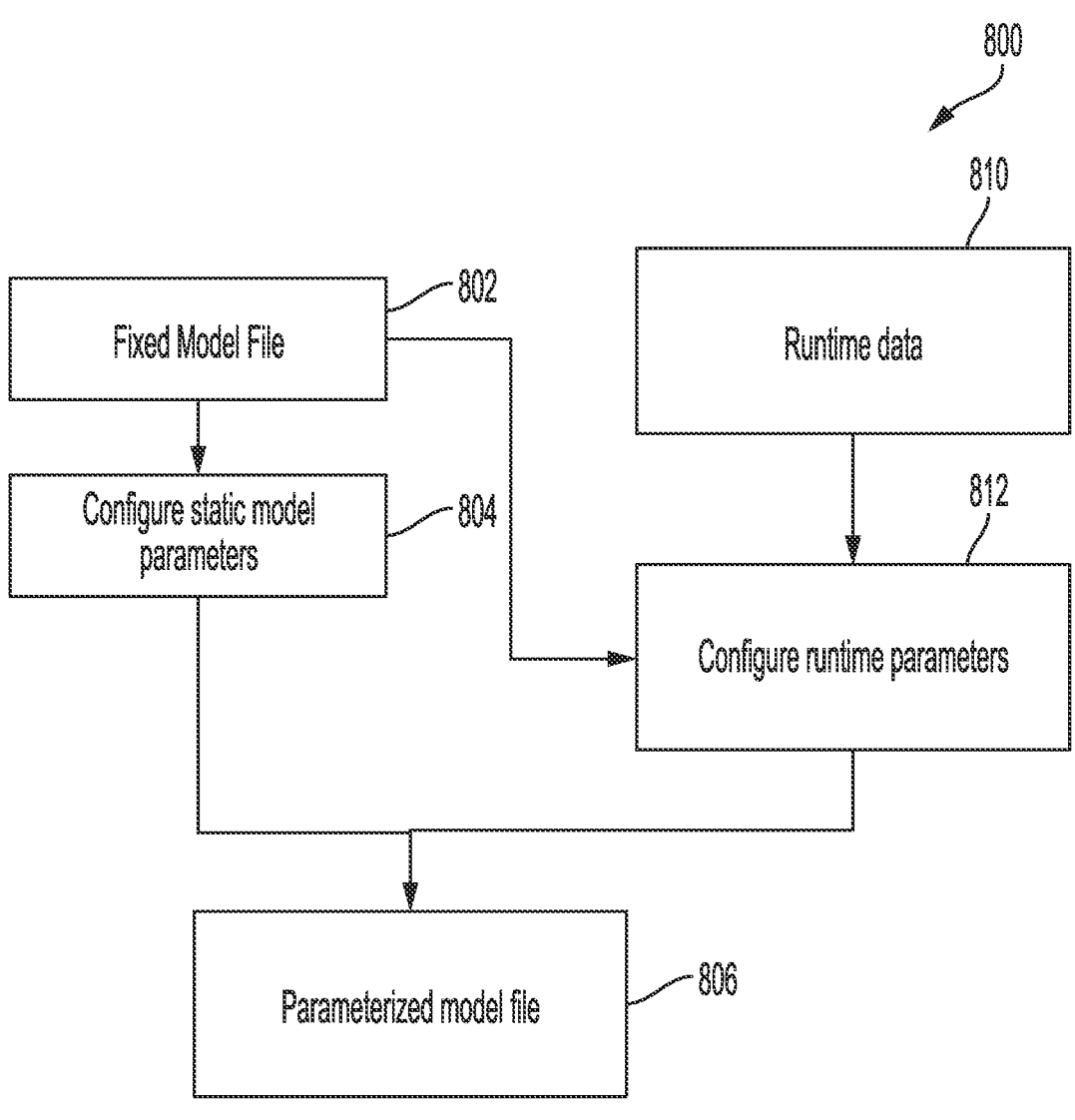
FIG. 8 is an exemplary block diagram for reconfiguring the machine learning algorithm height classification operable within an ultrasonic sensor system.

FIG. 8 illustrates an exemplary block diagram 800 for the reconfigurable machine learning model that may be employed within an ultra-sonic sensor-based height classification system (e.g., system 300). In addition to creating a reconfigurable model, the present disclosure contemplates creating a parameter assignment module that may be used to assign the necessary parameters to the reconfigurable model. Once the necessary parameters are assigned, the machine learning model may be tested.

With reference to FIG. 8, two types of configurations are contemplated. At block 802, a fixed parameter model may be obtained after the training process discussed above. This fixed parameter model may include features, split thresholds, invalid values and missing value assignments in a specific arrangement in the form of decision trees.

It is contemplated the different features and associated split threshold values may be completely parameterized. For instance, a parameterized model (block 806) may be created to include full decision trees where each node comprises of variables for both the feature names and the split values thresholds at each node. At block 804, the variables in the configurable model may be assigned to the features and split thresholds that are static values from the fixed parameters model.

The reconfigurable machine learning model may operate using tree-based models that are not simple binary trees. Depending on the features that may be used, additional parameters like invalid values and missing values may be employed. Logic may be implemented into each node of the configurable model file. Block 812 illustrates the parameters may be assigned based on the information received from the fixed model file (block 802), actual feature values, or the received runtime measurements/data (block 810). It is also contemplated block 812 may execute during runtime to assign such parameters in the configurable model.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data, logic, and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for tuning a machine learning classifier, comprising:
   receiving one or more object class requirements, wherein the one or more object class requirements include one or more rank thresholds used to rank an object, and wherein the one or more object class requirements include (i) a traversability rank of the object and (ii) a range goal that defines a minimum distance from the object a machine learning algorithm should not provide false positive results;
   training a base classifier using a weighted loss function, wherein the weighted loss function includes one or more weight values that are computed using the one or more object class requirements;
   evaluating an output of the weighted loss function using an objective function, wherein the objective function is established with the one or more object class requirements;
   tuning the one or more weight values using the weighted loss function if the output of the weighted loss function does not converge within a predetermined loss threshold;
   maneuvering a vehicle to avoid the object in response to (i) the traversability rank of the object being less than a rank threshold and (ii) a distance between the vehicle and the object being less than the minimum distance; and
   forgoing maneuvering the vehicle to avoid the object in response to (i) the traversability rank of the object being less than, greater than or equal to the rank threshold and (ii) the distance between the vehicle and the object being greater than the minimum distance.

2. The method of claim 1, wherein the weighted loss function is a cross entropy classification loss function.

3. The method of claim 1, wherein the object class requirements are established for an ultra-sonic sensor system.

4. The method of claim 1, wherein the object class requirements are established for differing vehicle platforms.

5. The method of claim 1, wherein the base classifier is used to determine a true positive output used for classifying the object.

6. The method of claim 1, wherein the base classifier is used to determine the false positive results used for classifying the object.

7. The method of claim 1, wherein the object class requirements are used to define the object having a specific geometry.

8. The method of claim 1, wherein the object class requirements are used to define the rank thresholds for the object having a rigid structure.

9. The method of claim 1, wherein the objective function is a squared distance to object error.

10. The method of claim 1, wherein the base classifier is used to define a predetermined distance between a vehicle and the object before a vehicle safety system is activated.

11. The method of claim 1 further comprising forgoing maneuvering the vehicle to avoid the object such that the vehicle traverses the object in response to (i) the traversability rank of the object being greater than the rank threshold and (ii) the distance between the vehicle and the object being less than the minimum distance.

12. A system for tuning a machine learning classifier, comprising:

one or more controllers configured to:

receive one or more object class requirements, wherein the one or more object class requirements include one or more rank thresholds used to rank an object classified by a machine learning algorithm, and wherein the one or more object class requirements include (i) a traversability rank of the object and (ii) a range goal that defines a minimum distance from the object the machine learning algorithm should not provide false positive results;

train a base classifier using a weighted loss function, wherein the weighted loss function includes one or more weight values that are computed using the one or more object class requirements;

evaluate an output of the weighted loss function using an objective function, wherein the objective function is established with the one or more object class requirements;

tune the one or more weight values using the weighted loss function if the output of the weighted loss function does not converge within a predetermined loss threshold, maneuver a vehicle to avoid the object in response to (i) the traversability rank of the object being less than a rank threshold and (ii) a distance between the vehicle and the object being less than the mi m distance; and forgo maneuvering the vehicle to avoid the object in response to (i) the traversability rank of the object being less than, greater than, or equal to the rank threshold and (ii) the distance between the vehicle and the object being greater than the minimum distance.

13. The system of claim 12, wherein the weighted loss function is a cross entropy classification loss function.

14. The system of claim 12, wherein the object class requirements are established for an ultra-sonic sensor system.

15. The system of claim 12, wherein the object class requirements are established for differing vehicle platforms.

16. The system of claim 12, wherein the base classifier is used to determine a true positive output used for classifying the object.

17. The system of claim 12, wherein the base classifier is used to determine the false positive results used for classifying the object.

18. The system of claim 12, wherein the controller is further configured to forgo maneuvering the vehicle to avoid the object such that the vehicle traverses the object in response to (i) the traversability rank of the object being greater than the rank threshold and (ii) the distance between the vehicle and the object being less than the minimum distance.

19. A method for tuning a machine learning classifier, comprising:

receiving one or more object class requirements, wherein the one or more object class requirements include one or more rank thresholds used to rank an object classified by a machine learning algorithm based on received ultra-sonic sensor data used within a vehicle, and wherein the one or more object class requirements include (i) a traversability rank of the object and (ii) a range goal that defines a minimum distance from the object the machine learning algorithm should not provide false positive results:

training a base classifier using a weighted loss function, wherein the weighted loss function includes one or more weight values that are computed using the one or more object class requirements;

evaluating an output of the weighted loss function using an objective function, wherein the objective function is established with the one or more object class requirements;

tuning the one or more weight values using the weighted loss function if the output of the weighted loss function does not converge within a predetermined loss threshold; and maneuvering the vehicle to avoid the object in response to (i) the traversability rank of the object being less than a rank threshold and (ii) a distance between the vehicle and the object being less than the minimum distance; and forgoing maneuvering the vehicle to avoid the object in response to (i) the traversability rank of the object being less than, greater than, or equal to the rank threshold and (ii) the distance between the vehicle and the object being greater than the minimum distance.

20. The method of claim 19 further comprising forgoing maneuvering the vehicle to avoid the object such that the vehicle traverses the object in response to (i) the traversability rank of the object being greater than the rank threshold and (ii) the distance between the vehicle and the object being less than the minimum distance.

* * * * *